US010248651B1

United States Patent
Fuerstenau et al.

(10) Patent No.: US 10,248,651 B1
(45) Date of Patent: Apr. 2, 2019

(54) SEPARATING TRANSLATION CORRECTION POST-EDITS FROM CONTENT IMPROVEMENT POST-EDITS IN MACHINE TRANSLATED CONTENT

(71) Applicant: Amazon Technologies, Inc., Seattle, WA (US)

(72) Inventors: Hagen Fuerstenau, Berlin (DE); Felix Hieber, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 202 days.

(21) Appl. No.: 15/360,286

(22) Filed: Nov. 23, 2016

(51) Int. Cl.
*G06F 17/28* (2006.01)
*G06F 17/24* (2006.01)

(52) U.S. Cl.
CPC .......... *G06F 17/2854* (2013.01); *G06F 17/24* (2013.01); *G06F 17/2836* (2013.01)

(58) Field of Classification Search
CPC .............................. G06F 17/28; G06F 17/2954
See application file for complete search history.

(56) References Cited

U.S. PATENT DOCUMENTS

| | | | | |
|---|---|---|---|---|
| 9,152,622 B2* | 10/2015 | Marcu | ................. | G06F 17/2854 |
| 2005/0137854 A1* | 6/2005 | Cancedda | ............... | G06F 17/28 704/9 |
| 2010/0138210 A1* | 6/2010 | Seo | ........................ | G06F 17/273 704/2 |
| 2011/0246173 A1* | 10/2011 | Li | ........................ | G06F 17/2827 704/2 |
| 2012/0284015 A1* | 11/2012 | Drewes | ............... | G06F 17/2818 704/3 |
| 2014/0188453 A1* | 7/2014 | Marcu | ................. | G06F 17/2854 704/2 |
| 2014/0303961 A1* | 10/2014 | Leydon | .................... | G06F 17/28 704/2 |
| 2014/0358519 A1* | 12/2014 | Mirkin | ................ | G06F 17/2854 704/3 |
| 2015/0106076 A1* | 4/2015 | Hieber | ................ | G06F 17/2854 704/2 |
| 2015/0286747 A1* | 10/2015 | Anastasakos | ..... | G06F 17/30917 707/776 |
| 2016/0321160 A1* | 11/2016 | Joo | ....................... | G06F 11/3608 |
| 2017/0075883 A1* | 3/2017 | Kamatani | ........... | G06F 17/2836 |
| 2017/0286376 A1* | 10/2017 | Mugan | ................ | G06F 17/2211 |

* cited by examiner

*Primary Examiner* — Douglas Godbold
(74) *Attorney, Agent, or Firm* — Lee & Hayes, P.C.

(57) ABSTRACT

Machine learning models can determine whether post-edits to machine translated content are corrective post-edits, which are edits made to correct translation errors caused during machine translation, or content improvement post-edits, which are post-edits that have been made to improve source language content. The corrective post-edits can be utilized to generate or modify labels for strings utilized to train a translation quality estimation system. The content improvement post-edits can be utilized to improve the quality of source content prior to providing the source content to the machine translation system for translation.

20 Claims, 7 Drawing Sheets

IMPROVING MACHINE TRANSLATION QUALITY ESTIMATION USING CORRECTIVE POST-EDITS

SEPARATING TRANSLATION CORRECTION POST-EDITS FROM CONTENT IMPROVEMENT POST-EDITS IN MACHINE TRANSLATED CONTENT

BACKGROUND

Machine translation post-editing is the process of manually correcting the output of a machine translation system to provide flawless translations. Machine translation combined with manual post-editing of machine translated content is typically much less expensive than entirely manual translation. Manual post-editing also allows the quality of the machine translation system to be assessed by counting the number of post-edits required to obtain a flawless translation. More post-edits are assumed to correspond to lower machine translation quality, while fewer post-edits are assumed to correspond to higher machine translation quality.

One challenge associated with the post-editing of machine translated content is that this process can mix together two kinds of post-edits: actual corrections of the translation (i.e. cases where the machine translation does not reflect the input source content); and content improvement post-edits (i.e. cases where the machine translation is correct, but the source content was sub-optimal and was therefore improved during the post-editing process). Because content improvement post-edits are unrelated to the machine translation process, mixing together different types of post-edits in this manner diminishes the capability of translation quality estimation systems to measure the quality of machine translation systems using approaches that count the number of post-edits required to obtain a flawless translation.

The disclosure made herein is presented with respect to these and other considerations.

DETAILED DESCRIPTION

Figure 1:
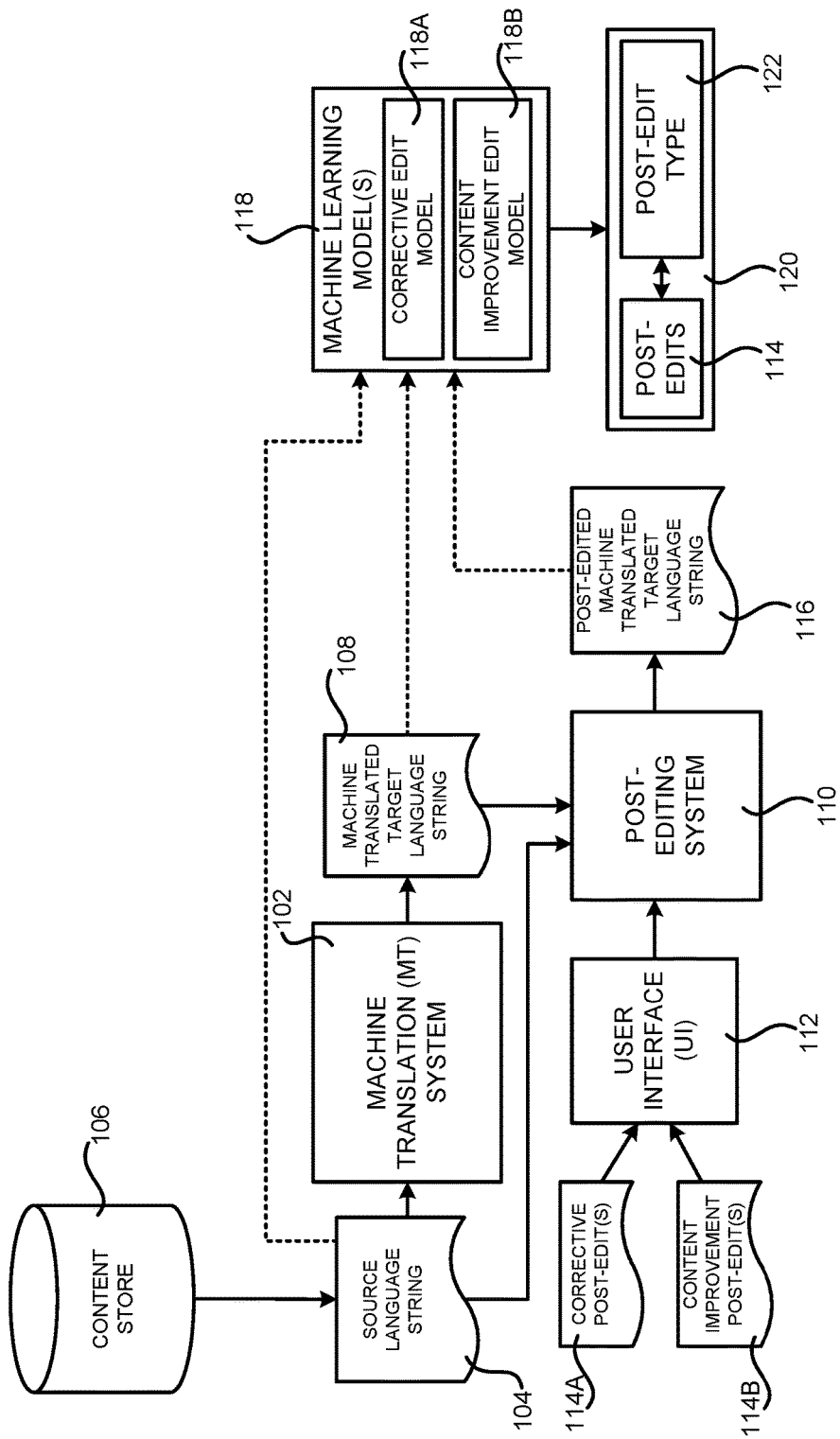
FIG. 1 is a computing system architecture diagram showing aspects of a computing system configured to provide functionality for separating translation correction post-edits from content improvement post-edits in machine translated content, according to one particular configuration.

The following detailed description is directed to technologies for separating translation correction post-edits from content improvement post-edits in machine translated content. In particular, machine learning models can be trained to determine whether post-edits to machine translated content are corrective post-edits, which are edits made to correct translation errors caused during machine translation, or content improvement post-edits, which are post-edits that have been made to improve source language content.

The corrective post-edits can be utilized to generate or modify labels for strings utilized to train a translation quality estimation system. Once trained, the translation quality estimation system can provide quality estimates for translations generated by a machine translation system for use in various ways. For example, and without limitation, if the quality estimate is low, the machine translation system might discard the machine translated target language string, re-translate the source language string using different parameters, improve the translation pipeline and/or models utilized by the machine translation system, and/or take other actions. This can improve the efficiency of the machine translation system, thereby saving central processing unit ("CPU") cycles, memory usage, network bandwidth usage and, potentially, the use of other types of computing resources.

The content improvement post-edits can be utilized to improve the quality of source content prior to providing the source content to the machine translation system for translation. For example, and without limitation, the content improvement post-edits can be used to modify content to be translated by removing words (e.g. redundant words) from the content, re-ordering words in the content to correspond to canonical formatting, and/or applying localization changes to the content prior to translation of the content. Stylistic changes can also be made to the content, the structure of the content can be changed, and/or grammatical constructions in the content can be made. Other types of changes to the content stored in the content store 106 can also be made in other configurations.

By modifying the content stored in the content store prior to translation based upon the content improvement post-edits, a machine translation system can generate improved translations that do not require post-editors to make the same content improvement post-edits that were previously made to translated content. This can save significant amounts of CPU time, memory usage, network bandwidth, and other types of computing resources.

Consequently, through an implementation of the disclosed technologies, higher quality translations can be produced by machine translation systems. Technical benefits other than those specifically identified herein can also be realized through an implementation of the disclosed technologies. Additional details regarding the various mechanisms described briefly above will be provided below with regard to FIGS. 1-7.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can also be practiced in distributed computing environments, such as a distributed computing network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a computing system architecture diagram showing aspects of a computing system configured to provide functionality for separating translation correction post-edits (also referred to herein as "corrective post-edits") from content improvement post-edits in machine translated content according to one particular configuration. As illustrated in FIG. 1, the technologies disclosed herein can be utilized with a machine translation ("MT") system 102. The MT system 102 is a computing system (i.e. software or a combination of both hardware and software) for translating content expressed in one human-readable language into another human-readable language. In the configuration shown in FIG. 1, for instance, source content such as the source language string 104 that is expressed in one human-readable language (e.g. English) can be stored in a content store 106. The MT system 102 can translate the source language string 104 to a target language string 108 that is expressed using another human-readable language (e.g. French or Spanish).

It is to be appreciated that the MT system 102 can utilize various mechanisms to translate source language strings to target language strings. For example, and without limitation, the MT system 102 utilize the machine translation pipeline, and other related technologies, described in U.S. patent application Ser. No. 14/867,932, which was filed on Sep. 28, 2015, and entitled "Optimized Statistical Machine Learning System with Rapid Adaptation Capability", and which is expressly incorporated by reference herein in its entirety. The MT system 102 can also utilize other machine translation technologies in other configurations.

As also illustrated in FIG. 1, the MT system 102 is operated in conjunction with a post-editing system 110. The post-editing system 110 provides functionality for allowing human post-editors to manually edit the machine translated target language strings 108 generated by the MT system 102. To enable this functionality, the post-editing system 110 can provide a user interface ("UI") 112 through which the human post-editors can make edits (referred to herein as "post-edits") to the machine translated target language strings 108. Post-edited machine translated target language strings 116 are output by the post-editing system 110.

As discussed briefly above, machine translation performed by the MT system 102 combined with manual post-editing of machine translated target strings 108 through post-editing, such as through the use of the post-editing system 110, is typically much less expensive than entirely manual translation of source language strings 104. Post-editing using the post-editing system 110 also allows the quality of the output generated by the MT system 102 to be assessed by counting the number of post-edits to the machine translated target language string 108 required to generate the post-edited machine translated target language string 116. More post-edits are assumed to correspond to lower machine translation quality, while fewer post-edits are assumed to correspond to higher machine translation quality.

As also discussed briefly above, one challenge associated with the post-editing of machine translated content in the manner described above is that this process can mix together two kinds of post-edits: corrective post-edits 114A (i.e. edits required because the machine translated target string 108 generated by the MT system 102 does not reflect the input source language string 104); and content improvement post-edits 114B (i.e. edits made where the machine translated target language string 108 is correct, but the source language string 104 was sub-optimal and was therefore improved by a post-editor during the post-editing process). Examples of content improvement post-edits 114B include, but are not limited to, edits that remove redundant words, re-ordering of information in product titles to correspond to canonical formatting, and removal of warranty/shipping information that is not applicable to a particular locale.

Because content improvement post-edits 114B are unrelated to the machine translation process performed by the MT system 102, mixing together different types of post-edits in this manner diminishes the capability of translation quality estimation systems to measure the quality of the MT system 102 using approaches that count the number of post-edits required to obtain a flawless translation. In many cases, human post-editors are not capable of distinguishing between different types of post-edits and, even if they were, distinguishing between different types of post-edits would be very time consuming. The technologies disclosed herein address these, and potentially other, considerations by automating a process for categorizing different types of post-edits in a way not possible by human post-editors. The categorized post-edits can then be utilized in various ways to improve a machine translation system. Consequently, the automated processes disclosed herein can save significant computing resources, such as those described above.

In order to address the considerations described above, one or more machine learning models 118 are utilized in one configuration. As shown in FIG. 1, for example, a corrective edit model 118A and a content improvement model 118B are utilized in one particular configuration. The corrective edit model 118A is configured to model the corrective post edits 114A and takes as input the source language strings 104, the machine translated target language strings 108, and the post-edited machine translated target language strings 116. The content improvement edit model 118B is configured to model the content improvement post-edits 114B and takes as input the machine translated target language strings 108 and the post-edited machine translated target language strings 116. In this way, the machine learning models 118 can be configured to infer the post-edits performed by a post-editor while also classifying each of them as either corrective post-edits 114A or content improvement post-edits 114B.

In one particular configuration, the machine learning models 118 are unsupervised generative statistical models that are fit to maximize the likelihood of the observed data. As discussed above, the corrective post-edits 114A are modeled taking into account the three inputs described above. The content improvement post-edits 114B are modeled taking into account the two inputs described above. The asymmetry of information utilized by the models 118A and 118B allows the two machine learning models 118A and 118B to adapt to different signals in the input data. In this regard, it is to be appreciated that other types of unsupervised machine learning models can be utilized in other configurations. Supervised machine learning models can also be utilized where training data is available indicating whether particular post-edits are corrective post-edits 114A or content improvement post-edits 114B.

The output of applying the machine learning models 118 to new data is a list 120 of the post-edits 114 along an indication of their type 122 (e.g. corrective post-edits 114A or content-improvement edits 114B. The post-edits 114 can be text insertions, text deletions, text replacements, or text movements.

Once the machine learning models 118 have generated the list 120 that identifies the post-edits 114 and the post-edit type 122 for the post-edits 114, the content of the list can be utilized to improve the quality of the MT system 102. For example, and without limitation, the corrective post-edits 114A identified in the list 120 can be utilized to generate or modify labels for strings utilized to train a translation quality estimation system (not shown in FIG. 1). Additional details regarding this process will be provided below with regard to FIGS. 2 and 4. Additionally, the content improvement post-edits 114B identified in the list 120 can be utilized to improve the quality of source content (i.e. content stored in the content store 106) prior to providing the source content to the MT system 102 for translation. Additional details regarding this aspect will be provided below with regard to FIGS. 3 and 4. In this regard, it is to be appreciated that the contents of the list 120 can be utilized to improve the quality of the machine translations generated by the MT system 102 in other ways in other configurations.

Figure 2:
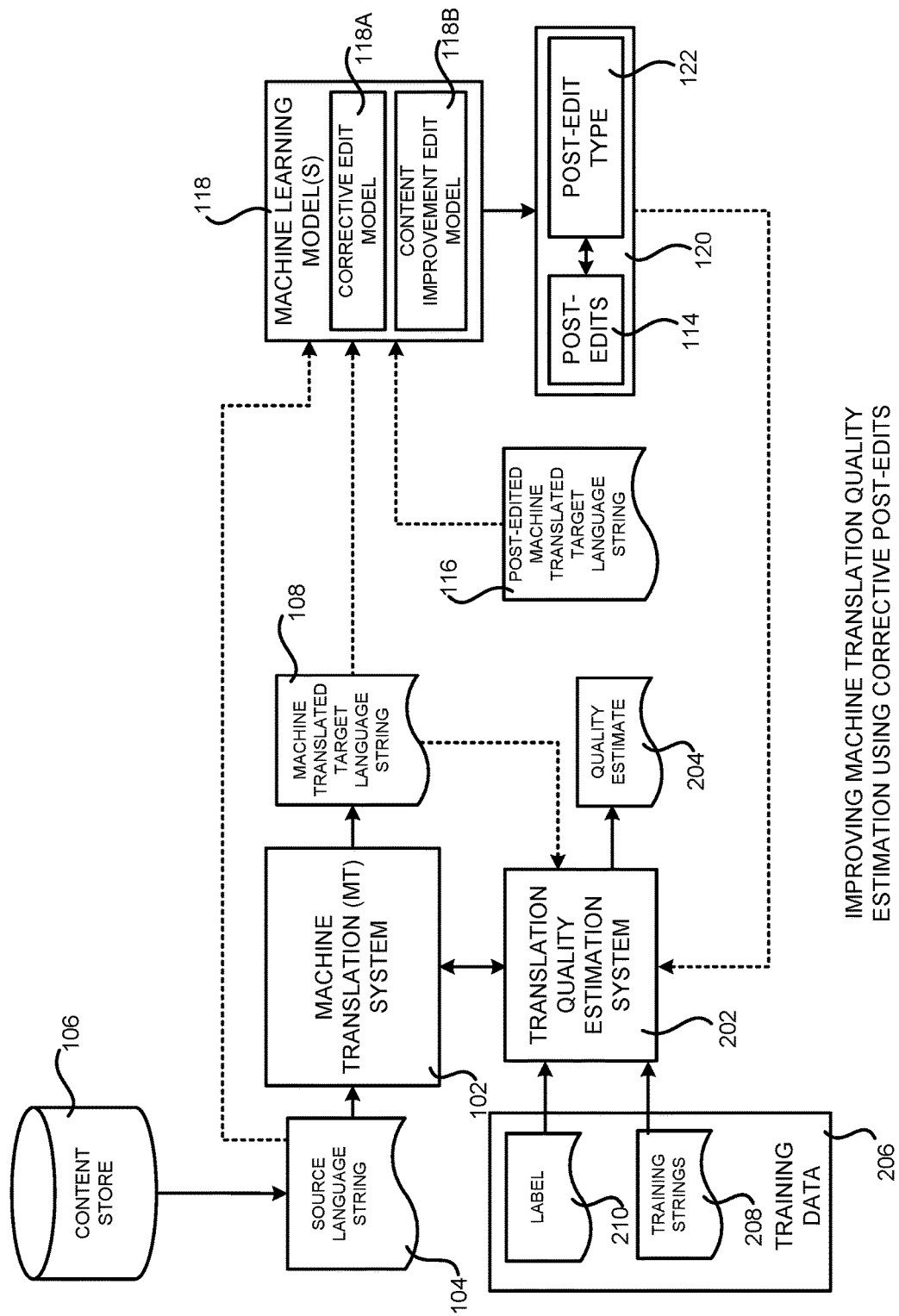
FIG. 2 is a computing system architecture diagram showing aspects of a computing system configured to provide functionality for improving machine translation quality using corrective post-edits identified using the mechanism shown in FIG. 1, according to one particular configuration.

FIG. 2 is a computing system architecture diagram showing aspects of a computing system configured to provide functionality for improving machine translation quality using corrective post-edits 114A identified using the mechanism shown in FIG. 1, according to one particular configuration. As illustrated in FIG. 2, the MT system 102 operates in conjunction with a translation quality estimation system 202 in one particular configuration. The translation quality estimation system 202 is a computing system (e.g. software or a combination of software and hardware) that is configured to compute quality estimates for machine translations generated by the MT system 102. The translation quality estimation system 202 can provide quality estimates 204 for machine translated target strings 108 generated by the MT system 102.

Training data 206 can be utilized in order to train the models utilized by the translation quality estimation system 202. As shown in FIG. 2, for example, the training data 206 can include training strings 208. The training strings 208 include source language strings and a target language and translated target language strings in a target language. The training data 206 also includes labels 210 for the training strings 208. The labels 210 provide an indication of the quality of the translated target language strings 208 in the training data 206. For example, and without limitation, the labels 210 can be expressed as human-targeted translation error rate ("HTER") values for the source and target language training strings 208. The HTER is an error metric for machine translation that measures the number of edits required to change a system output (e.g. a machine translated target string) into a post-edited machine translated target language string. More post-edits (i.e. a higher HTER) are assumed to correspond to lower machine translation quality, while fewer post-edits (i.e. a lower HTER) are assumed to correspond to higher machine translation quality.

As shown in FIG. 2 and described above, the corrective edit model 118A can take as input the machine translated target language string 108 and the post-edited machine translated target language string 116 and generate a list 120 of the post-edits 114 made to the machine translated target language string 108 and, for each of the post-edits 114, specify the post-edit type 122 (i.e. whether each post-edit 114 is a corrective post-edit 114A or a content improvement post-edit 114B).

As also shown in FIG. 2, the translation quality estimation system 202 takes the list 120 of post-edits 114 and post-edit types 122 as input. In order to improve the quality of the training data 206, the content improvement edits identified in the list are removed from the HTER scores prior to use in training the translation quality estimation system 202. In this way, the influence of the content improvement edits on the training of the translation quality estimation system 202 can be removed.

Once trained using the training data 206, the translation quality estimation system 202 can provide quality estimates 204 for translations generated by the MT system 102 (or other systems), for use in various ways. For example, and without limitation, if the quality estimate 204 is low, the MT system 102 might discard the machine translated target language string 108, re-translate the source language string 104 using different parameters, improve the translation pipeline and/or models utilized by the MT system 102, and/or take other actions. This can improve the efficiency of the MT system 102, thereby saving CPU cycles, memory usage, network bandwidth usage and, potentially, the use of other types of computing resources. Additional details regarding this process will be provided below with regard to FIG. 4.

Figure 3:
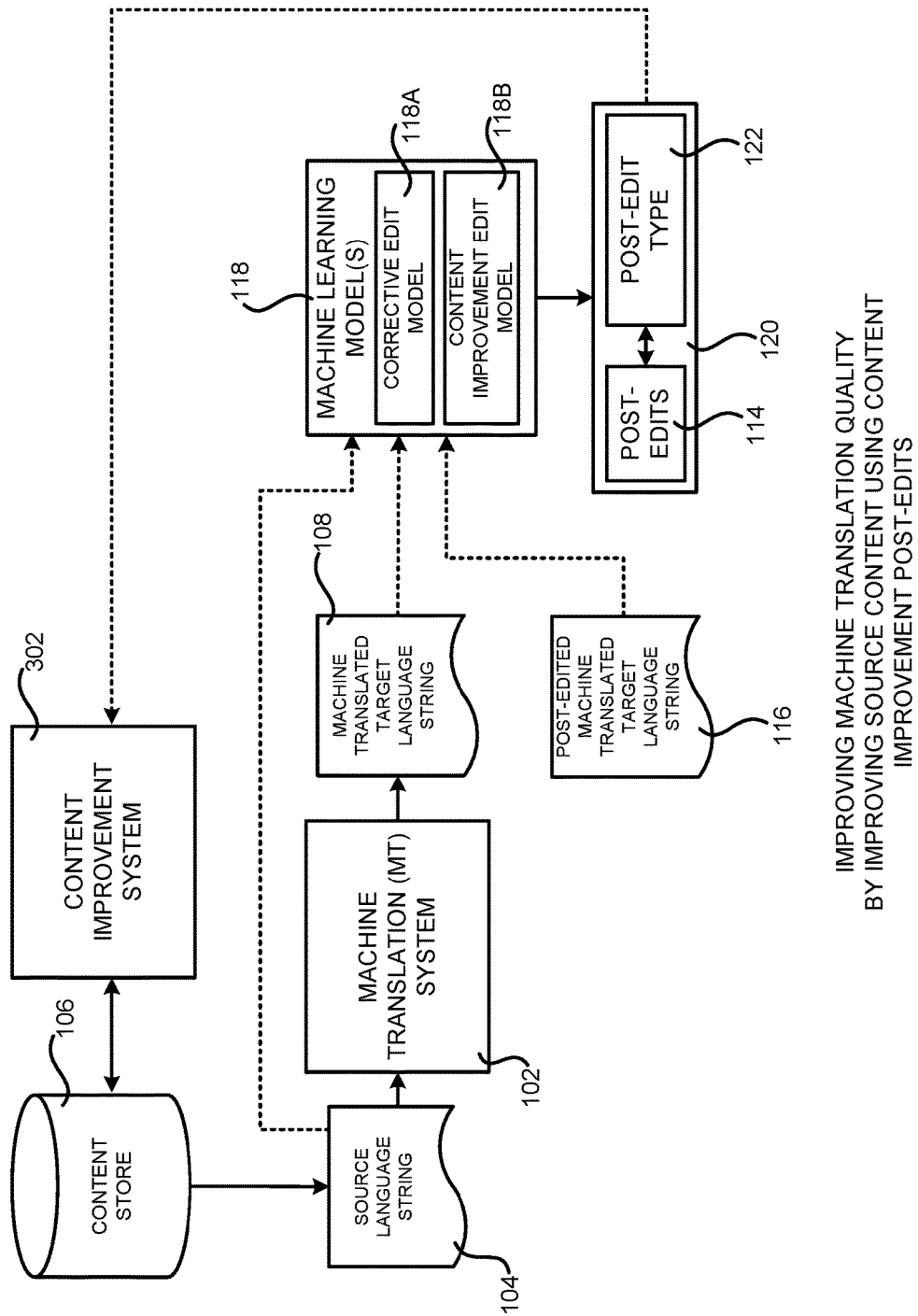
FIG. 3 is a computing system architecture diagram showing aspects of a computing system configured to provide functionality for improving machine translation quality by improving source content using content improvement post-edits identified using the mechanism shown in FIG. 1, according to one particular configuration.

FIG. 3 is a computing system architecture diagram showing aspects of a computing system configured to provide functionality for improving machine translation quality by improving source content using content improvement post-edits 114B identified using the mechanism shown in FIG. 1, according to one particular configuration. As illustrated in FIG. 3, the MT system 102 operates in conjunction with a content improvement system 302 in one particular configuration. The content improvement system 302 is a computing system (i.e. software or a combination of hardware and software) that provides functionality for improving the content (e.g. the content stored in the content store 106 such as the source language string 103) that is submitted to the MT system 102 for translation.

In one configuration, the content improvement system 302 also receives the list 120 of post-edits 114 and post-edit types 122. The content improvement system 302 can then utilize the content improvement post-edits 114B contained in the list 120 to improve the content stored in the content store 106 (e.g. the source language string 104) prior to submission to the MT system 102 for translation.

For example, and without limitation, the content improvement system 302 can modify the content stored in the content store 106 by removing words (e.g. redundant words) from the content, re-ordering words in the content to correspond to canonical formatting, and/or applying localization changes to the content prior to translation of the content by the MT system 102. The content improvement system 302 can also make stylistic changes to the content, change the structure of the content, and/or modify grammatical constructions. Other types of changes to the content stored in the content store 106 can also be made in other configurations.

The content improvement system 302 can utilized various mechanisms to automate the modification of the content stored in the content store 106. For example, and without limitation, rules can be defined that specify how the content stored in the content store 106 is to be modified in view of certain content improvement post-edits 114B. One rule might, for instance, be utilized to replace multiple instances of punctuation marks (e.g. !!!!!) with a single instance of the punctuation mark. Another rule might specify canonical formatting for the content and specify how the content is to be re-ordered. Other rules can be defined for modifying other types of content in the content store 106. Other mechanisms can also be utilized to improve the content stored in the content store 106 based upon the identified content improvement post-edits 114B in other configurations.

By modifying the content stored in the content store 106 prior to translation based upon the content improvement post-edits 114B, the MT system 102 can generate improved translations that do not require post-editors to make the same content improvement post-edits 114B that were previously made to translated content. This can save significant amounts of CPU time, memory usage, network bandwidth, and other types of computing resources. Additional details regarding this process will be provided below with regard to FIG. 4.

Figure 4:
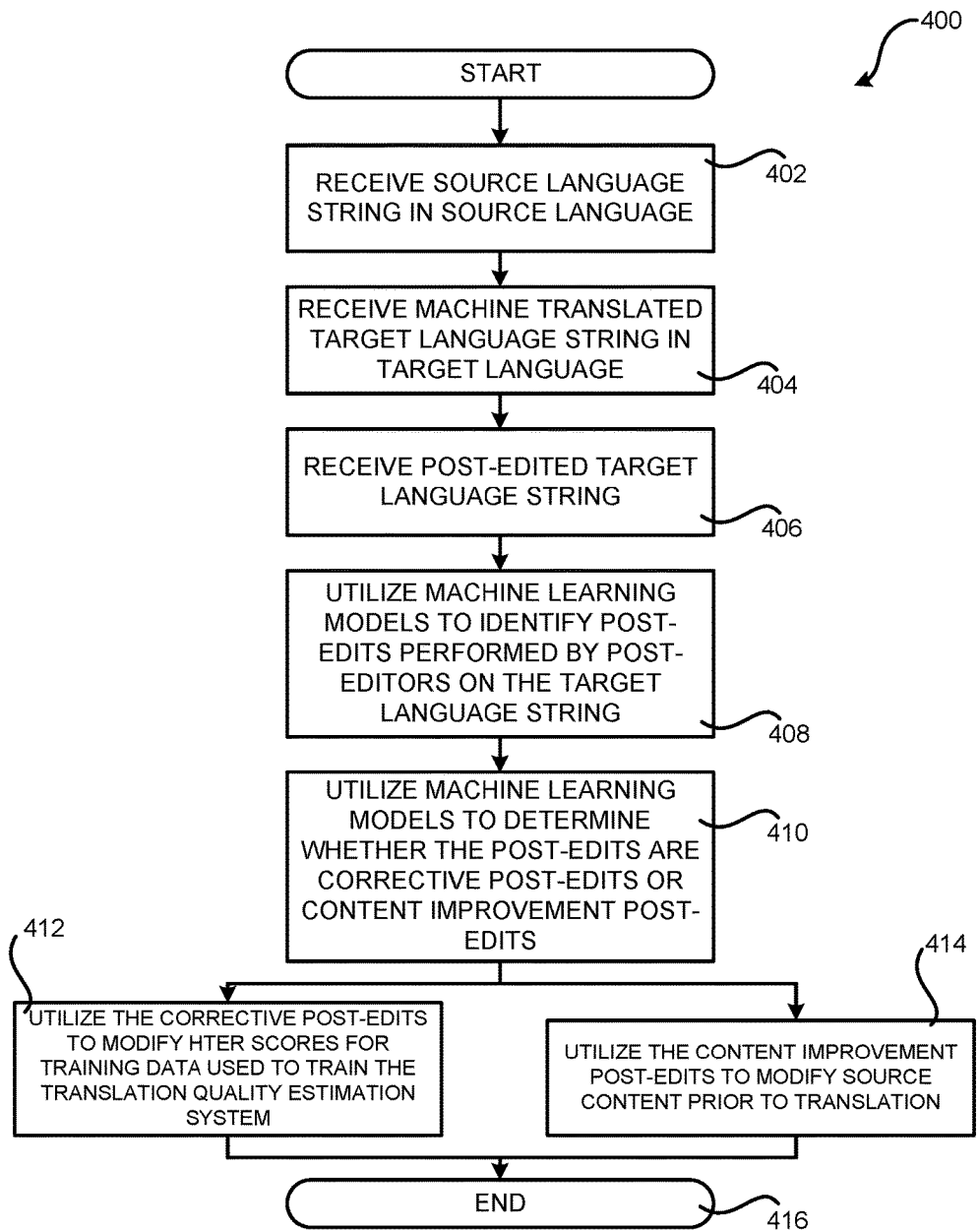
FIG. 4 is a flow diagram showing a routine that illustrates additional aspects of the operation of the computing system shown in FIGS. 1-3 for separating translation correction post-edits from content improvement post-edits in machine translated content according to one particular configuration.

FIG. 4 is a flow diagram showing a routine 400 that illustrates additional aspects of the operation of the computing system shown in FIGS. 1-3 for separating corrective post-edits 114A from content improvement post-edits 114B in machine translated content according to one particular configuration. It should be appreciated that the logical operations described herein with respect to FIG. 4, and the other FIGS., can be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special-purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 400 begins at operation 402, where the machine learning models 118 receive the source language string 104 in the source language. The routine 400 then proceed from operation 402 to operation 404, where the machine learning models 118 receive the machine translated target language string 108. The routine 400 then proceeds from operation 404 to operation 406, where the machine learning models 118 receive the post-edited machine translated target language string 116. From operation 406, the routine 400 proceeds to operation 408.

At operation 408, the machine learning models 118 utilize the machine translated target language string 108 and the post-edited machine translated target language string 116 to identify the post-edits 114 made by the post-editor to the machine translated target language string 108. Once the post-edits 114 have been identified, the routine 400 proceeds to operation 410, where the machine learning models 118 determine whether the post-edits 114 identified at operation 408 are corrective post-edits 114A or content improvement post-edits 114B.

In particular, and as discussed above, the corrective edit model 118A is configured to model the corrective post edits 114A, and takes as input the source language strings 104, the machine translated target language strings 108, and the post-edited machine translated target language strings 116. The content improvement edit model 118B is configured to model the content improvement post-edits 114B, and takes as input the machine translated target language strings 108 and the post-edited machine translated target language strings 116. In this way, the machine learning models 118 can be configured to infer the post-edits performed by a post-editor while also classifying each of them as either corrective post-edits 114A or content improvement post-edits 114B. The post-edits 114 and their associated types 122 can then be stored in the list 120 or in another manner.

From operation 410, the routine 400 proceeds to operations 412 and 414. At operation 410, the corrective post-edits are utilized to modify or compute the labels 210 (e.g. HTER scores) for the training strings 208 in the training data 206 in the manner described above with regard to FIG. 2. At operation 414, the content improvement post-edits 114B are utilized to modify source content prior to translation by the MT system 102 in the manner discussed above with regard to FIG. 3. The routine 400 then proceeds from operations 412 and 414 to operation 416, where it ends.

It is to be appreciated that, in one particular configuration, rules for determining whether a post-edit is a corrective post-edit 114A or a content improvement post-edit 114B can also be utilized with the statistical models described above. For example, and without limitation, rules can be defined that specify that certain types of post-edits 114 are corrective post-edits 114A or content improvement post-edits 114B. In a similar fashion, informed priors can also be defined to influence the machine learning models 118 regarding whether certain post-edits 114 are corrective post-edits 114A or content improvement post-edits 114B. Using these mechanisms, the burden on the machine learning models 118 to learn whether certain post-edits 114 are corrective post-edits 114A or content improvement post-edits 114B can be reduced.

Figure 5:
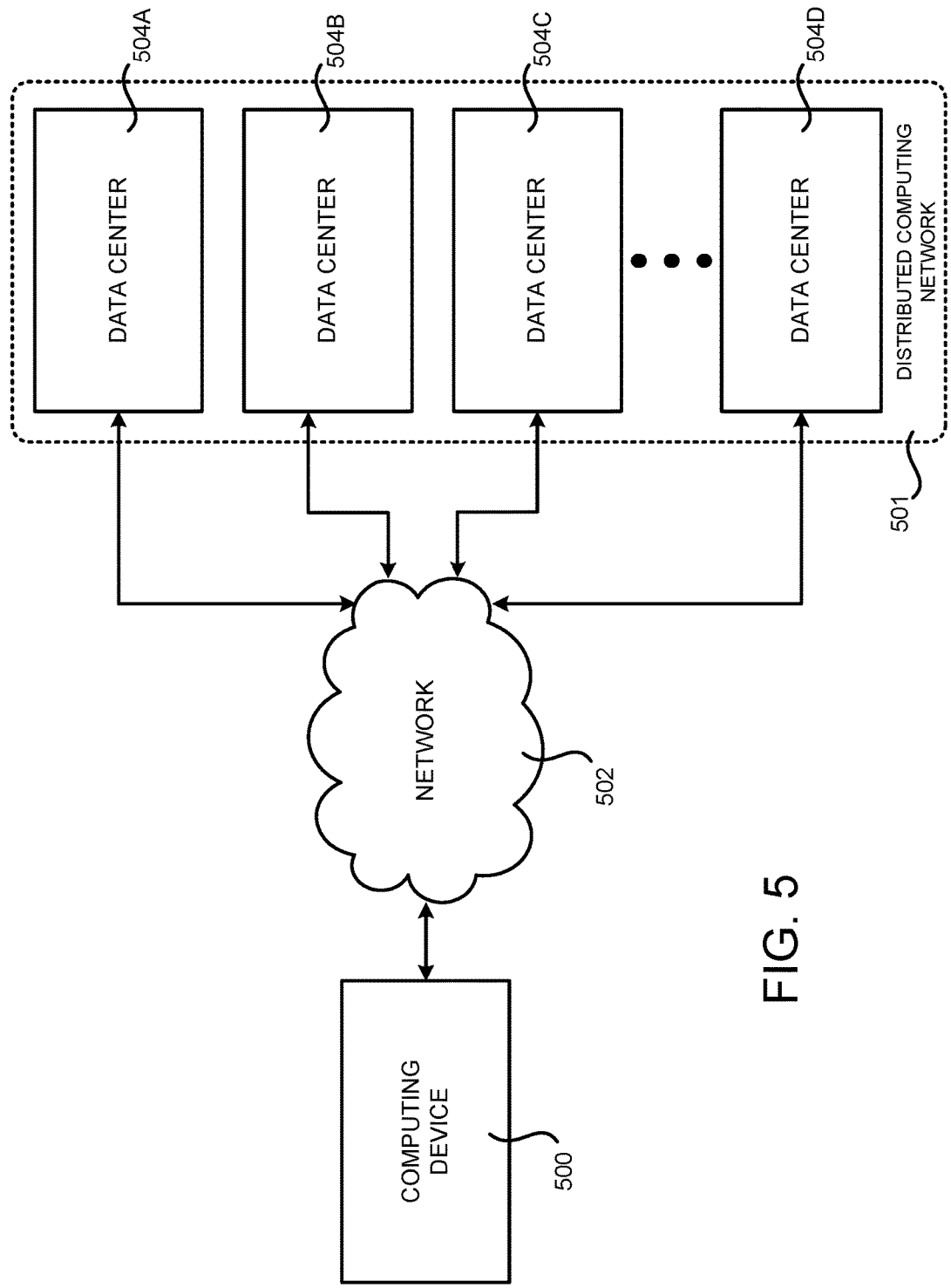
FIG. 5 is a system and network diagram that shows one illustrative operating environment for the configurations disclosed herein that includes a distributed computing network.

FIG. 5 is a system and network diagram that shows one illustrative operating environment for the configurations disclosed herein that includes a distributed computing network 501 that can be configured to implement the various technologies described above. The distributed computing network 501 can execute network services that provide computing resources on a permanent or an as-needed basis.

Among other types of functionality, the computing resources provided by the distributed computing network 501 can be utilized to implement the various software components described herein. The computing resources provided by the distributed computing network 501 can include various types of computing resources, such as data processing resources like VM instances, data storage resources, networking resources, data communication resources, network services, and the like.

Each type of computing resource provided by the distributed computing network 501 can be general-purpose or can be available in a number of specific configurations. For example, data processing resources can be available as physical computers or VM instances in a number of different configurations. The VM instances can be configured to execute applications, including Web servers, application servers, media servers, database servers, some or all of the software components described above, and/or other types of programs. Data storage resources can include file storage devices, block storage devices, and the like. The distributed computing network 501 can also be configured to provide other types of computing resources not mentioned specifically herein.

As also discussed above, the computing resources provided by the distributed computing network 501 are enabled in one implementation by one or more data centers 504A-504D (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative configuration for a data center 504 that can be utilized to implement the technologies disclosed herein will be described below with regard to FIG. 6.

Users of the distributed computing network 501 can access the computing resources provided by the distributed computing network 501 over a network 502, which can be a wide area communication network ("WAN"), such as the Internet, an intranet or an Internet service provider ("ISP") network or a combination of such networks. For example, and without limitation, a computing device 500 operated by a user of the distributed computing network 501 can be utilized to access the distributed computing network 501 by way of the network 502. It should be appreciated that a local-area network ("LAN"), the Internet, or any other networking topology known in the art that connects the data centers 504 to remote users can be utilized. It should also be appreciated that combinations of such networks can also be utilized.

Figure 6:
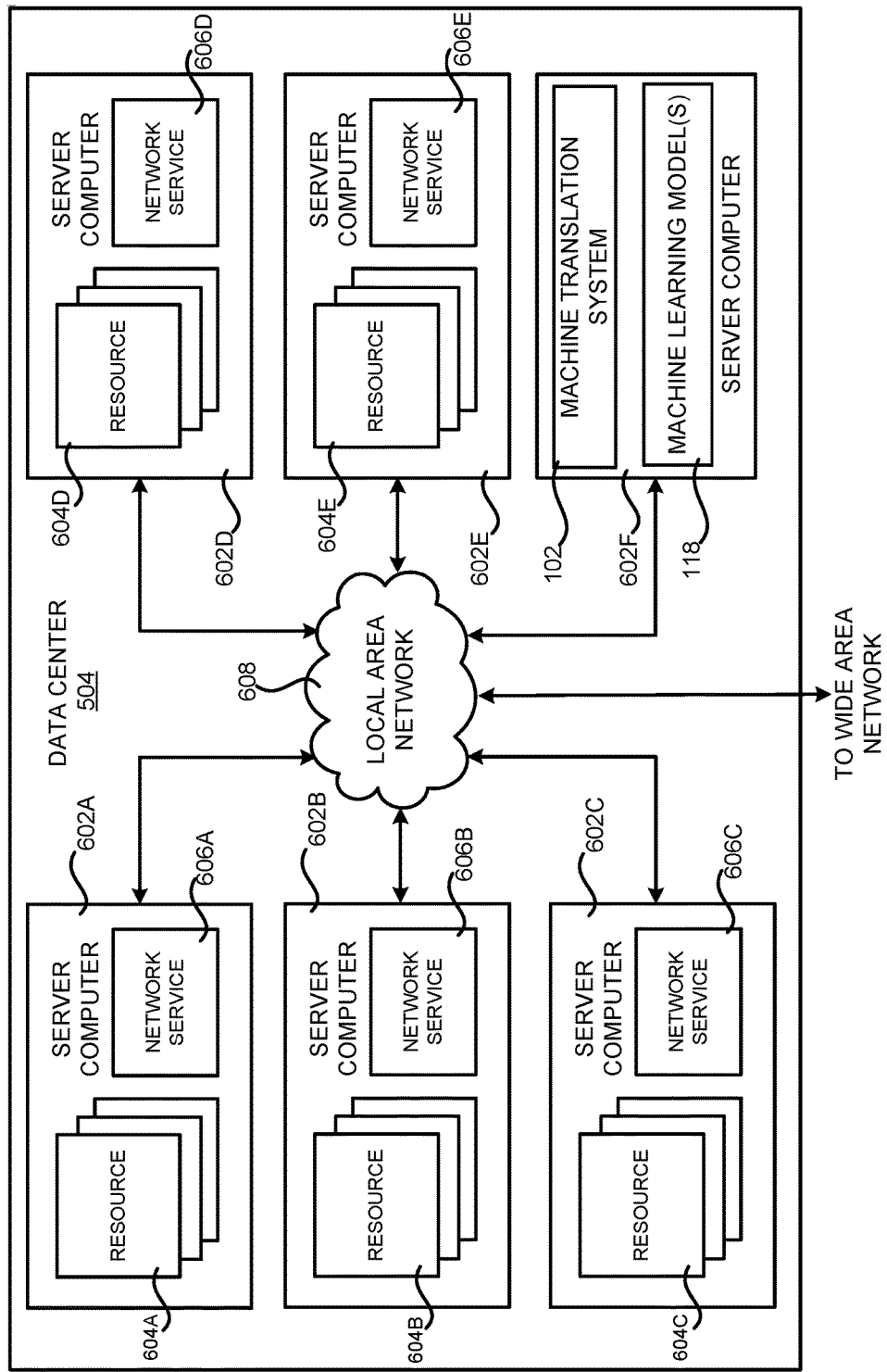
FIG. 6 is a computing system diagram illustrating a configuration for a data center that can be utilized to implement aspects of the technologies disclosed herein.

FIG. 6 is a computing system diagram that illustrates one configuration for a data center 504 that implements aspects of the technologies disclosed herein. The example data center 504 shown in FIG. 6 includes several server computers 602A-602F (which might be referred to herein singularly as "a server computer 602" or in the plural as "the server computers 602") for providing the computing resources 604A-604E.

The server computers 602 can be standard tower, rackmount, or blade server computers configured appropriately for providing the computing resources 604 described herein (illustrated in FIG. 6 as the computing resources 604A-604E). As mentioned above, the computing resources 604 provided by the distributed computing network 501 can be data processing resources such as VM instances or hardware computing systems, data storage resources, database resources, networking resources, and others. Some of the servers 602 can also be configured to execute network services 606A-606E, respectively, capable of instantiating, providing and/or managing the computing resources 604.

The data center 504 shown in FIG. 6 also includes a server computer 602F that can execute some or all of the software components described above. For example, and without limitation, the server computer 602F can be configured to execute the machine translation system 102 and/or the machine learning models 118, which were described in detail above. The server computer 602F can also be configured to execute other components and/or to store data for providing some or all of the functionality described herein. In this regard, it should be appreciated that the various software components disclosed herein can execute on many other physical or virtual servers in the data centers 504 in various configurations.

In the example data center 504 shown in FIG. 6, an appropriate LAN 608 is also utilized to interconnect the server computers 602A-602F. The LAN 608 is also connected to the network 502 illustrated in FIG. 5. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 504A-504D, between each of the server computers 602A-602F in each data center 504, and, potentially, between computing resources 604 in each of the data centers 504. It should be appreciated that the configuration of the data center 504 described with reference to FIG. 6 is merely illustrative and that other implementations can be utilized.

Figure 7:
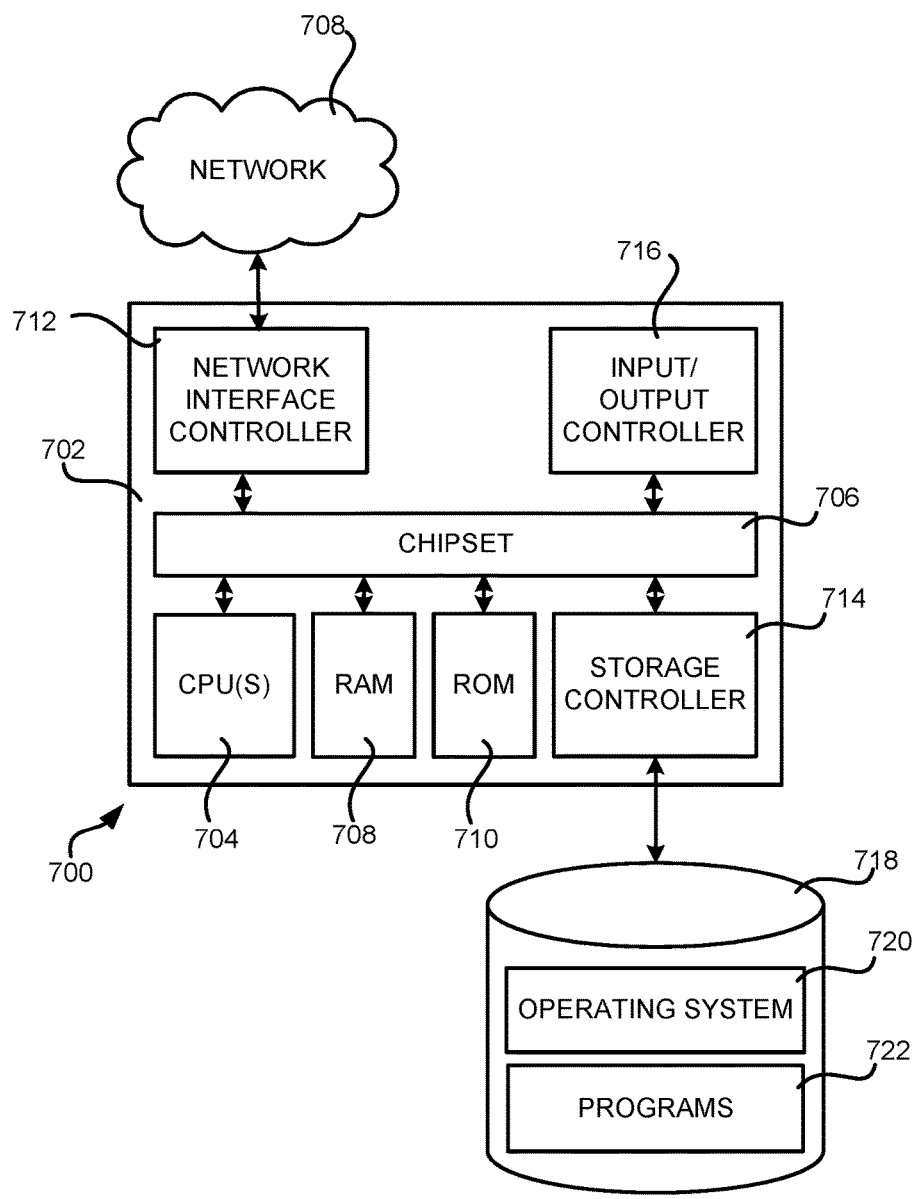
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 708. The chipset 706 can include functionality for providing network connectivity through a NIC 712, such as a gigabit Ethernet adapter. The NIC 712 is capable of connecting the computer 700 to other computing devices over the network 708. It should be appreciated that multiple NICs 712 can be present in the computer 700, connecting the computer to other types of networks and remote computer systems.

The computer 700 can be connected to a mass storage device 718 that provides non-volatile storage for the computer. The mass storage device 718 can store an operating system 720, programs 722, and data, which have been described in greater detail herein. The mass storage device 718 can be connected to the computer 700 through a storage controller 714 connected to the chipset 706. The mass storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the mass storage device 718 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 718 is characterized as primary or secondary storage, and the like.

For example, the computer 700 can store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 can store an operating system 720 utilized to control the operation of the computer 700. According to one configuration, the operating system comprises the LINUX operating system. According to another configuration, the operating system comprises the WINDOWS® SERVER operating system from MICROSOFT CORPORATION. According to further configurations, the operating system can comprise the UNIX operating system or one of its variants. It should be appreciated that other operating systems can also be utilized. The mass storage device 718 can store other system or application programs and data utilized by the computer 700.

In one configuration, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various processes described above with regard to FIGS. 1-4. The computer 700 can also include computer-readable storage media for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, a plotter, or other type of output device. It will be appreciated that the computer 700 might not include all of the components shown in FIG. 7, can include other components that are not explicitly shown in FIG. 7, or might utilize an architecture completely different than that shown in FIG. 7.

Based on the foregoing, it should be appreciated that technologies for separating translation correction post-edits from content improvement post-edits in machine translated content have been presented herein. It is also to be appreciated that the various types of strings described above can be stored in a database in connection with the operation of a translation management system ("TMS") The strings stored in the database can be processed in batch in the manner described above. By processing the strings in batch, various types of computing resources, like network bandwidth, can be saved. The strings can also be stored in the TMS along with data identifying the type of post-edits within the strings. This can also save storage space as compared to previous solutions.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus, comprising:
   one or more processors; and
   one or more non-transitory computer-readable storage media having instructions stored thereupon which are executable by the one or more processors and which, when executed, cause the apparatus to:
      receive a source language string expressed in a source language;
      receive a target language string comprising a machine translation of the source language string into a target language generated by a machine translation system;
      receive a post-edited target language string comprising the target language string following post-editing by one or more post-editors;
      utilize one or more unsupervised machine learning models to identify one or more post-edits performed by the one or more post-editors on the target language string and, to identify for the one or more post-edits, whether the one or more post-edits are corrective post-edits or content improvement post-edits, the corrective post-edits indicating an incorrect translation of the source language string in the post-edited target language string and the content improvement post-edits indicating a refinement of a correct machine translation of the source language string;
      utilize the corrective post-edits to modify labels associated with strings used to train a translation quality estimation system; and
      automate a modification of content that is stored in a content database and that is submitted to the machine translation system for translation, the modification based on the content improvement post-edits.

2. The apparatus of claim 1, wherein the one or more unsupervised machine learning models comprise one or more generative statistical models.

3. The apparatus of claim 1, wherein the one or more unsupervised machine learning models comprise a machine learning model for modeling the corrective post-edits that takes the source language string, the target language string, and the post-edited target language string as input.

4. The apparatus of claim 1, wherein the one or more unsupervised machine learning models comprise a machine learning model for modeling the content improvement post-edits that takes the target language string and the post-edited target language string as input.

5. The apparatus of claim 1, wherein the one or more post-edits performed by the one or more post-editors on the target language string comprise text insertions, text deletions, text replacements, or text movements.

6. The apparatus of claim 1, wherein the modification of content comprises removing words from the content, re-ordering words in the content to correspond to canonical formatting, or applying localization changes to the content prior to translation of the content by the machine translation system.

7. The apparatus of claim 1, wherein the labels associated with the strings used to train the translation quality estimation system comprise human-targeted translation error rate (HTER) values for the strings used to train the translation quality estimation system.

8. A computer-implemented method, comprising:
   utilizing one or more machine learning models to identify one or more post-edits performed by one or more post-editors on a target language string generated from a source language string by a machine translation system;
   executing the one or more machine learning models to determine whether the one or more post-edits are corrective post-edits or content improvement post-edits, the corrective post-edits indicating an incorrect translation of the source language string and the content improvement post-edits indicating a refinement of a correct machine translation of the source language string;
   utilizing the corrective post-edits to generate labels associated with strings used to train a translation quality estimation system; and
   automating a modification of content that is stored in a content database and that is submitted to the machine translation system for translation, the modification based at least in part on the content improvement post-edits.

9. The computer-implemented method of claim 8, wherein the labels associated with the strings used to train the translation quality estimation system comprise human-targeted translation error rate (HTER) values for the strings used to train the translation quality estimation system.

10. The computer-implemented method of claim 8, wherein the modification is further based on rules indicating at least replacing multiple instances of a punctuation mark with a single instance of the punctuation mark.

11. The computer-implemented method of claim 8, wherein the modification comprises removing words from the content, re-ordering words in the content to correspond to canonical formatting, or applying localization changes to the content prior to translation of the content by the machine translation system.

12. The computer-implemented method of claim 8, wherein the one or more machine learning models comprise one or more generative statistical models.

13. The computer-implemented method of claim 8, wherein the one or more machine learning models comprise a machine learning model for modeling the corrective post-edits that takes as input the source language string, the target language string, and a post-edited target language string comprising the target language string following post-editing by one or more post-editors.

14. The computer-implemented method of claim 8, wherein the one or more machine learning models comprise a machine learning model for modeling the content improvement post-edits that takes as input the target language string and a post-edited target language string comprising the target language string following post-editing by one or more post-editors.

15. A non-transitory computer-readable storage media having instructions stored thereupon that are executable by one or more processors and which, when executed, cause the one or more processors to:

utilize one or more machine learning models to identify one or more post-edits performed by one or more post-editors on a target language string generated from a source language string by a machine translation system;

execute the one or more machine learning models to determine whether the one or more post-edits are corrective post-edits or content improvement post-edits, the corrective post-edits indicating an incorrect translation of the source language string and the content improvement post-edits indicating a refinement of a correct machine translation of the source language string; and automate a modification of content that is stored in a content database and that is submitted to the machine translation system, the modification based at least in part on the content improvement post-edits.

16. The non-transitory computer-readable storage media of claim 15, wherein the modification comprises removing words from the content, re-ordering words in the content to correspond to canonical formatting, or applying localization changes to the content prior to translation of the content by the machine translation system.

17. The non-transitory computer-readable storage media of claim 15, wherein the non-transitory computer-readable storage media has further instructions stored thereupon to utilize the corrective post-edits to generate labels associated with strings used to train a translation quality estimation system.

18. The non-transitory computer-readable storage media of claim 17, wherein the labels associated with the strings used to train the translation quality estimation system comprise human-targeted translation error rate (HTER) values for the strings used to train the translation quality estimation system.

19. The non-transitory computer-readable storage media of claim 15, wherein the one or more machine learning models comprise a machine learning model for modeling the corrective post-edits that takes as input the source language string, the target language string, and a post-edited target language string comprising the target language string following post-editing by one or more post-editors.

20. The non-transitory computer-readable storage media of claim 15, wherein the one or more machine learning models comprise a machine learning model for modeling the content improvement post-edits that takes as input the target language string and a post-edited target language string comprising the target language string following post-editing by one or more post-editors.

* * * * *